Patented July 9, 1929.

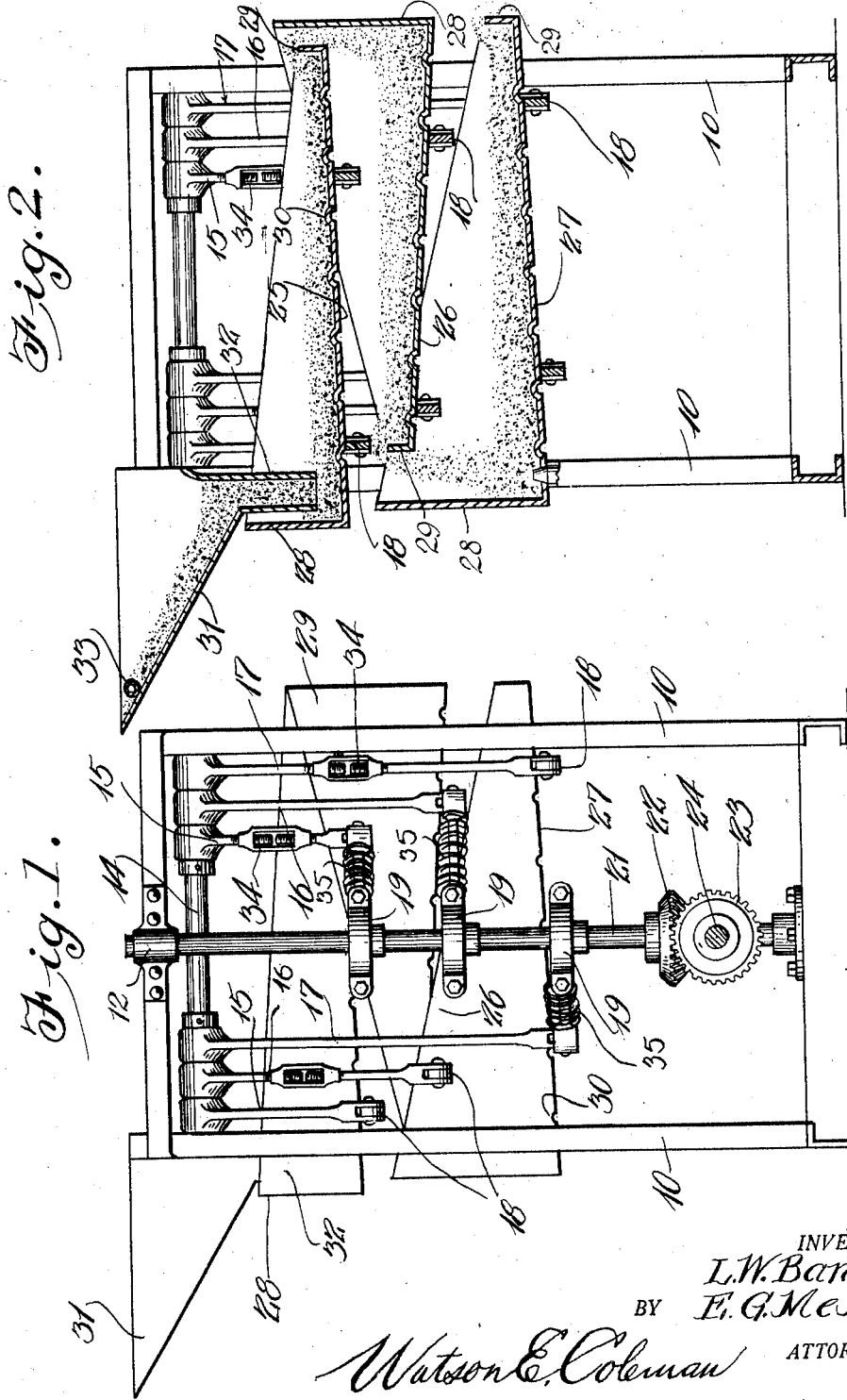

1,719,958

UNITED STATES PATENT OFFICE.

LEWIS W. BANEY AND ERNEST G. MESSER, OF ELMA, WASHINGTON.

SEPARATING AND CONCENTRATING MECHANISM.

Application filed May 2, 1925, Serial No. 27,500. Renewed December 27, 1928.

This invention relates to machines for separating and concentrating minerals, and particularly gold from fine sand, the invention being particularly designed for the separation of flour gold.

One of the objects of the invention is to provide a concentrator and separator of this character which is very simple, which may be easily operated, and which is thoroughly effective, and in this connection to provide a separating mechanism including a plurality of pans, one discharging into the other, the material to be separated being fed into the uppermost pan and the sand or fines from the uppermost pan discharging in turn into a lower pan and this in turn into a still lower pan, and to provide means whereby the pans are reciprocated parallel to the direction of the riffles whereby the gold is held in the pan behind the riffles, there being no motion of the pan which will act to carry the gold over the riffles and out of the side of the pan.

A further object is to provide a mechanism of this character in which the inclination of the several pans may be changed or adjusted.

A still further object is to provide a machine which will act equally well to separate gold from either dry or wet sand but where wet sand is used to retain the water with the sand so as to keep the sand porous.

Other objects will appear in the course of the following description.

Our invention is illustrated in the accompanying drawings, wherein:—

Figure 1 is an end elevation of a concentrator constructed in accordance with our invention;

Figure 2 is a transverse sectional view of the concentrator pans, the supporting frame being shown in elevation, the lower rails of the frame being in section.

Referring to these drawings, 10 designates standards. Mounted upon one of these standards is an outwardly extending bearing bracket 12. Mounted in suitable bearings carried on the upper ends of the standards are the transverse, parallel shafts 14. From each shaft depends a plurality of pairs of links, one pair of links being designated 15, the next longer links 16, and the third or longest links 17, and pivotally connected to the lower ends of these links are the transversely extending bars 18 which are extended beyond the several links and carry the eccentric rings 19. These eccentric rings for the several bars are disposed in line with each other and are operated by means of eccentrics or cams mounted upon a shaft 21. This shaft 21 carries upon it a beveled gear wheel 22, which in turn is engaged by a beveled gear wheel 23 mounted upon a drive shaft 24.

Mounted upon the several pairs of links are the pans 25, 26 and 27, these pans being carried on the transversely extending bars 18. The pan 25 is the uppermost pan and one side wall 28 of this pan is relatively high, while the opposite side wall 29 is relatively low. This pan is inclined downward from its low side toward its high side and the bottom of the pan is formed with a series of longitudinally extending riffles 30. Discharging into this pan is the feed table 31 which is downwardly inclined and then has a downwardly extending spout 32 which is relatively long, that is, as long as the feed table, and which extends parallel to the side wall 28 of the pan. At the top of the feed table there is disposed a water discharge pipe 33 which is perforated so that water may be sprayed down over the face of the feed table but carrying material down into the pan 25.

The pan 26 is mounted upon the links 16 and is disposed with its low wall 29 on the inlet side of the machine and with its high wall 28 disposed on the opposite side of the machine. It will be seen that the pan 26 is disposed outward of the pan 25 so that certain of the contents of the pan 25 discharge over the low wall 29 of this pan and into the deepest portion of the pan 26, this pan being inclined reversely to the inclination of the pan 25. This pan is also provided with the longitudinally extending riffles 30. The pan 27 is inclined reversely to the pan 26 and has its low wall 29 disposed below the high wall of the pan 26, while the pan extends beyond the low wall side of the pan 26 and has a high wall 28 which extends up to a point above the upper edge of the low wall 29 of this pan just as the wall 28 of the pan 26 extends above the low wall 29 of the pan 25. This lowermost pan is also provided with the longitudinally extending riffles 30, and it will be obvious that as the shaft 21 is rotated the pans will be given a swinging movement parallel to the length of the riffles and parallel to the side walls of the pan.

It is to be particularly noted that the pans are inclined alternately in opposite directions with the low wall of the upper pan having its upper edge disposed slightly below the upper edge of the deep wall of a next lower pan and spaced from this wall a sufficient distance to permit the sand and water which overflow the low side wall to fall into the subjacent pan, and that thus the sand and water flowing over the low side wall of each pan pass down into the pan below. The riffles on the bottom of each pan act to retain the gold, the fines or sand flowing over them and the gold being held behind them, this being secured by the endwise motion. Because of the endwise movement of the pan, the gold is held in the pan behind the riffles and there is no motion which would carry the gold over the riffles and out of the side of the pan. Inasmuch as the pan is inclined downward away from this discharge side, it follows that the gold has to climb over the riffles to get out of the pan and as the gold is heavier it remains on the lower portion of the pan.

Preferably turnbuckles 34 are disposed in those links which are engaged with the highest side of a pan so that the inclination of the pans may be changed by adjusting these turnbuckles. Mercury may be used in the bottoms of the pans if desired, but the machine is particularly designed to be used without mercury. This machine is perfectly capable of handling dry sand as well as wet sand and will also concentrate any metal that has a greater specific gravity than sand. The material from the feed table passing from each of the pans enters the successive pan at a lower point than the point at which it discharges and thence it travels transversely to the direction of movement of the pan.

In order to prevent the pans bumping as they shift back and forth, we preferably cushion the pans by means of springs 35 which are disposed around the concentric rods 18 and operate between the eccentric rings 19 and cross bars 36 carried by the uprights 10, the opposite side being appropriately spring cushioned. Thus the action of the pans is cushioned.

It will be noted that the pans work alternately, that is, one moving in one direction and the other in the other direction. If they worked in the same direction all together they would cause a jerk on the machinery. After concentration the material remaining in the pans may be readily removed therefrom through an aperture in the deepest portion of the pan normally closed by a plug. It will be noted, as before stated, that the riffles run parallel with the motion of the pan and this is the preferably manner of so disposing these riffles, as when the riffles are at right angles to the motion of the pan the sand tends to pack between the riffles, making it impossible for the light gold to settle at the bottom of the pan, but where the riffles extend parallel with the direction of motion of the pan the jerk of the motion keeps the sand moving longitudinally between the riffles, not allowing it to pack. The light material works to the surface bed and the motion of the pan and the current of water flowing over the surface of the sand cause the material to shake level, which causes a discharge according to the amount of material that is entering the uppermost pan.

Attention is particularly called to the fact that the low wall 29 of the pan is higher than any of the riffles. This causes a relatively deep bed to be formed or carried upon the pan so that there is no continuous discharge of gold, heavy sands, etc., from one pan to a lower pan, but it is the water and floating particles in the water that are carried over the pan into the pan below. Thus there is no disturbance of the bed and no forcing of the sands or pulp over the riffles by the motion of the pan, nor are there any currents formed which will carry away any fine gold that is in the course of settling. We discharge by the leveling of the material in the machine without any current or motion from the inlet side to the discharge side of the pan. Once the gold settles in this machine, the smooth motion which is applied to it allows it to stay sunk, whereas were the pan submitted to a jumping and uneven action, the fine gold would not be allowed to settle to the bottom. As before remarked, the wall 29 provides for a relatively deep bed of sand and prevents a continuous washing away of fine gold which is in the act of settling.

This principle is the same in working either wet sand or dry but, of course, it must be understood that the sand if dry must be absolutely dry. It will be seen that we do not have any motion or current of water to carry our gold over, the material having to cross the line of reciprocation. We do not use a great deal of water but have a water-tight bed that holds a certain amount of water at all times and the overflow water which passes over the lip 29 of each pan is very thin. There is no current of water. The discharge at the lip 29 is caused by the leveling of the sand which is secured by the longitudinal motion.

While we have illustrated the pans as reciprocating by means of eccentrics, we do not wish to be limited to this as it is obvious that a number of other mechanical movements might be used for the purpose of causing a reciprocation of the cams.

We claim:—

A concentrating and separating mechanism of the character described including a pan having end walls and side walls, the pan being provided with longitudinally extending parallel riffles, the pan being supported with its bottom inclined in a direction transverse to the general direction of the riffles and on its higher side having a relatively low wall presenting a vertical side to the pulp and substantially deeper than and extending above the tops of all the riffles and on its lower side having a relatively high wall, said walls acting to retain a relatively deep bed upon the pan, means for supporting the pan and giving it a reciprocation only in a direction approximately parallel to the direction of the riffles, and means for feeding wash water and pulp to that side of the pan having the relatively high wall.

In testimony whereof we hereunto affix our signatures.

LEWIS W. BANEY.
ERNEST G. MESSER.